(12) United States Patent
Fandella

(10) Patent No.: US 7,578,384 B2
(45) Date of Patent: Aug. 25, 2009

(54) LINK OF CONVEYOR CHAIN

(75) Inventor: Sergio Fandella, Mogliano Veneto (IT)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 11/480,986

(22) Filed: Jul. 6, 2006

(65) Prior Publication Data
US 2007/0034484 A1 Feb. 15, 2007

(30) Foreign Application Priority Data
Aug. 12, 2005 (IT) .......................... TV2005A0121

(51) Int. Cl.
*B65G 17/06* (2006.01)
(52) U.S. Cl. ................... 198/844.1; 198/851; 198/852; 198/853; 198/779
(58) Field of Classification Search ............... 198/844.1, 198/851
See application file for complete search history.

(56) References Cited

U.S. PATENT DOCUMENTS

| | | | | |
|---|---|---|---|---|
| 3,435,780 A | * | 4/1969 | Jones et al. | 104/172.5 |
| 4,821,869 A | * | 4/1989 | Hodlewsky | 198/779 |
| 4,909,380 A | * | 3/1990 | Hodlewsky | 198/779 |
| 5,096,050 A | * | 3/1992 | Hodlewsky | 198/779 |
| 5,261,525 A | * | 11/1993 | Garbagnati | 198/779 |
| 5,330,045 A | * | 7/1994 | Hodlewsky | 198/779 |
| 5,489,020 A | * | 2/1996 | Clopton | 198/851 |
| 5,549,194 A | * | 8/1996 | Dag | 198/845 |
| 6,029,802 A | * | 2/2000 | Musiari et al. | 198/852 |
| 6,138,820 A | * | 10/2000 | Ewert | 198/850 |
| 6,398,015 B1 | * | 6/2002 | Sedlacek et al. | 198/779 |
| 2006/0144678 A1 | | 7/2006 | Fandella | |

FOREIGN PATENT DOCUMENTS

| | | |
|---|---|---|
| EP | 0066530 A1 | 12/1982 |
| EP | 0318173 A1 | 5/1989 |

* cited by examiner

*Primary Examiner*—Gene Crawford
*Assistant Examiner*—Kavel P Singh
(74) *Attorney, Agent, or Firm*—Hodgson Russ LLP (57) ABSTRACT

A link of a conveyor chain is connectable to a similar and adjacent link and has a main base body with two shoulders, protruding upward from ends of transverse sides of the main base body. Ends of a pair of first and second shafts are associated with the pair of shoulders and first rollers are rotatably associated with the shafts. Second rollers are associated on the pair of first and second shafts and are supported in a loaded condition by at least one pair of first supporting elements, activatable when a load passes. A third shaft, with which third rollers are associated rotatably, is further provided that is supported by at least one pair of second supporting elements, the ends of the third shaft being free.

23 Claims, 6 Drawing Sheets

LINK OF CONVEYOR CHAIN

BACKGROUND OF THE INVENTION

In the provision of industrial systems for bottling liquids or for packaging goods of various kinds, the design of suitable systems for moving the products from one processing station to the next and toward the store is very important.

In performing the production cycles provided by these systems, it is often necessary to convey and stop the conveyed products in chosen positions, so as to be able to perform the various steps provided by said process, such as for example the filling of bottles, their closure, or the packaging of products of various kinds, or the accumulation of packages or containers.

Known types of conveyor chain, composed of a plurality of links which are mutually interconnected so as to form a chosen path, which can comprise straight and curved portions, are currently in use for moving goods within systems in which the working cycles provide for conveying or stopping the products in one or more positions.

One particularly strongly felt need is to allow the products to stop in the chosen positions without requiring the simultaneous stopping of the conveyor chain, which would entail high complexity in production and high costs for its operation.

For this purpose, it is known to manufacture conveyor chains which are constituted by interconnecting several links, each of which comprises a base body which has a substantially rectangular plan shape and on the transverse sides of which one or more shafts are supported which are arranged longitudinally with respect to the base body and transversely to the direction of advancement of the products on said chain; a plurality of rollers is associated with said shafts so that they can rotate freely and constitute the upper conveyance surface of the chain.

A first known type of link provides, on the transverse sides of the base body, a plurality of seats which are approximately U-shaped and are open upward for supporting the one or more shafts, the ends of which are inserted from above into said seats.

A second known type of link has, at the transverse sides of its base body, a plurality of through holes, which are for example aligned in pairs and within which the ends of the one or more shafts are inserted and thus supported.

In both of these known embodiments, if the products to be moved have substantial dimensions and/or weights, the shafts, owing to their longitudinal extension, are made to rest, in one or more intermediate points thereof, on a corresponding number of supports, which protrude upward from the base body and have a seat for rotatably accommodating a portion of said shaft.

The presence of the rollers in such links of the known type allows to convey the products and to stop them without having to interrupt the movement of the conveyor chain.

The moved product can in fact be blocked in the chosen position by means of a retention barrier without generating an intense friction force with respect to the chain thanks to the interposition of the rollers, which by rotating about the shaft that supports them reduce drastically the extent of such force; in this manner, the presence of stationary objects on the chain does not hinder the advancement of the chain.

The main drawback that can be observed in these known types of conveyor chain is that they have high wear of the intermediate supports, since the shaft that rests on them, if turned by the rollers that it supports, slides continuously on said intermediate supports, even in the presence of light loads on the conveyor chain.

Another drawback of known types of conveyor chain is that since each shaft rests directly on the corresponding intermediate support, it is extremely difficult to clean this region of the conveyor chain, and therefore debris from the outside environment or from the conveyed products, such as for example dust or splinters caused by the breakage of glass bottles, can penetrate between the shaft and the intermediate supports, increasing the drag of the chain and accelerating its wear; accordingly, long line downtimes are necessary in order to perform the required cleaning operations.

Another drawback of such known types of conveyor chain is that at the intermediate supports there is a considerable discontinuity in the upper supporting surface, which may give rise to an imperfect placement of the product on the chain, especially when said product has a narrow resting base, consequently hindering the correct execution of the cycle of the system within which said chain is inserted.

SUMMARY OF THE INVENTION

The aim of the present invention is to solve the above-mentioned problems, eliminating the drawbacks of the cited background art, by providing a device which allows to achieve low wear of the conveyor chain, even if it is used to convey material having a certain weight or if axially very long shafts are used.

Within this aim, an object of the present invention is to provide a device which allows quick and easy cleaning, so as to reduce line downtimes.

Another object is to provide a device which allows optimum placement of the conveyed products even if said products have a narrow resting base.

Another object is to provide a device which is structurally simple and has low manufacturing costs.

This aim and these and other objects, which will become better apparent hereinafter, are achieved by a link of a conveyor chain, which comprises means for articulated connection to a similar and adjacent link and a main base body which comprises two shoulders, which protrude upward from the ends of the transverse sides of said main base body and are arranged parallel to the direction of advancement of said chain, the ends of a pair of first and second shafts being associated with said pair of shoulders, first rollers being rotatably associated with said shafts, characterized in that second rollers are associated on said pair of first and second shafts, have a smaller diameter than said first rollers, and are supported in a loaded condition by at least one pair of first supporting elements, which can be activated when a load passes, protrude from said main base body and lie or not on a same plane which is transverse with respect to said pair of first and second shafts, and in that it comprises a third shaft, with which third rollers are associated rotatably, said third shaft being supported by at least one pair of second supporting elements, which protrude from said main base body and lie on a plane which is parallel and distinct with respect to the plane of arrangement of said first supporting elements, the ends of said third shaft being free.

BRIEF DESCRIPTION OF THE DRAWINGS

Further characteristics and advantages of the invention will become better apparent from the following detailed description of a particular but not exclusive embodiment thereof, illustrated by way of non-limiting example in the accompanying drawings, wherein.

DESCRIPTION OF THE PREFERRED EMBODIMENTS

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

With reference to the figures, the reference numeral 1 designates a link of a conveyor chain according to the invention, which is constituted by a main base body 2, which is approximately flat and has an approximately rectangular plan shape.

Two wings 6 can protrude downward from the base body 2, in its central region, and are preferably L-shaped and arranged symmetrically with respect to a central plane of the link 1.

The link 1 comprises known articulation means for articulated connection to a similar and adjacent link, so as to allow the provision of a conveyor chain which is constituted by a succession of multiple links 1, which are mutually identical and are arranged consecutively with respect to each other along the advancement direction of said chain.

Said articulation means for articulated connection are constituted by a lug 3, which is arranged between the wings 6, protrudes at the front and centrally from the main base body 2, and has an approximately trapezoidal plan shape, with its shorter parallel side directed forward.

A through slot or hole 4 is formed on the lug 3, proximate to its front end 3a, and its axis is arranged transversely with respect to the advancement direction of the conveyor chain.

The lug 3 can be accommodated within an approximately complementarily shaped first central seat 5, which is formed centrally at the rear edge 2a of the main base body 2 of an adjacent link 1; the first central seat 5 has, in plan view, an approximately rectangular shape, which is slightly wider than the lug 3, and is open at the rear edge 2a, so as to allow the insertion of said lug within said seat with a chosen functional play.

The first wings reach the lateral edges 5a of the first central seat 5.

Two ridges 7 are formed on the wings 6 at the lateral edges 5a, and a receptacle 7a is formed therein, has a preferably circular cross-section and is open toward the inside of the link 1, in order to support the ends of a transverse pivot, not shown in the figure, which can be inserted within the through slot or hole 4a formed in the lug 3 so as to ensure the connection between two consecutive links 1.

Said pivot has a smaller diameter than the through slot or hole 4a; since the first seat 5 further is wider than the lug 3, relative rotation between two adjacent links 1 on the conveyance plane is allowed and occurs at curved portions of the conveyor chain.

The link of conveyor chain 1 according to the invention can therefore be used both to provide straight conveyance portions and curved conveyance portions, according to the requirements of each specific case.

Two tabs 8 can protrude radially in the opposite direction from the lower ends of the wings 6, each protruding toward the outside of the link 1; the tabs 8 can be inserted slidingly within complementarily shaped seats formed on a guide, which is not shown in the figures, and which slidingly supports the links 1, so as to contrast forces acting in the direction for lifting said links, which can occur for example at curved portions of the conveyor chain.

Two shoulders 10a and 10b protrude upward at the lateral ends of the transverse sides of the main base body 2 and are arranged parallel to the advancement direction of the chain; suitable first and second seats 10c, 10d are formed thereon and are mutually aligned along an axis which is longitudinal with respect to the main base body 2 and transverse to the advancement direction of the chain; the ends of two first and second shafts, designated by the reference numerals 9a and 9b, are associated with said first and second seats 10c, 10d, and said first and second shafts are arranged on a same plane which is approximately parallel to the plane of arrangement of the surface of the main base body 2 from which the two shoulders 10a and 10b protrude.

A plurality of first rollers 14 provided with an axial hole is associated rotatably with each of the first and second shafts 9a and 9b.

At least two first supporting elements protrude upward from the main base body 2, each such supporting element being constituted by a pair of protrusions 12a, 12b and 12c, 12d, which are arranged in pairs on a same plane which lies transversely to said pair of first and second shafts.

Figure 1:
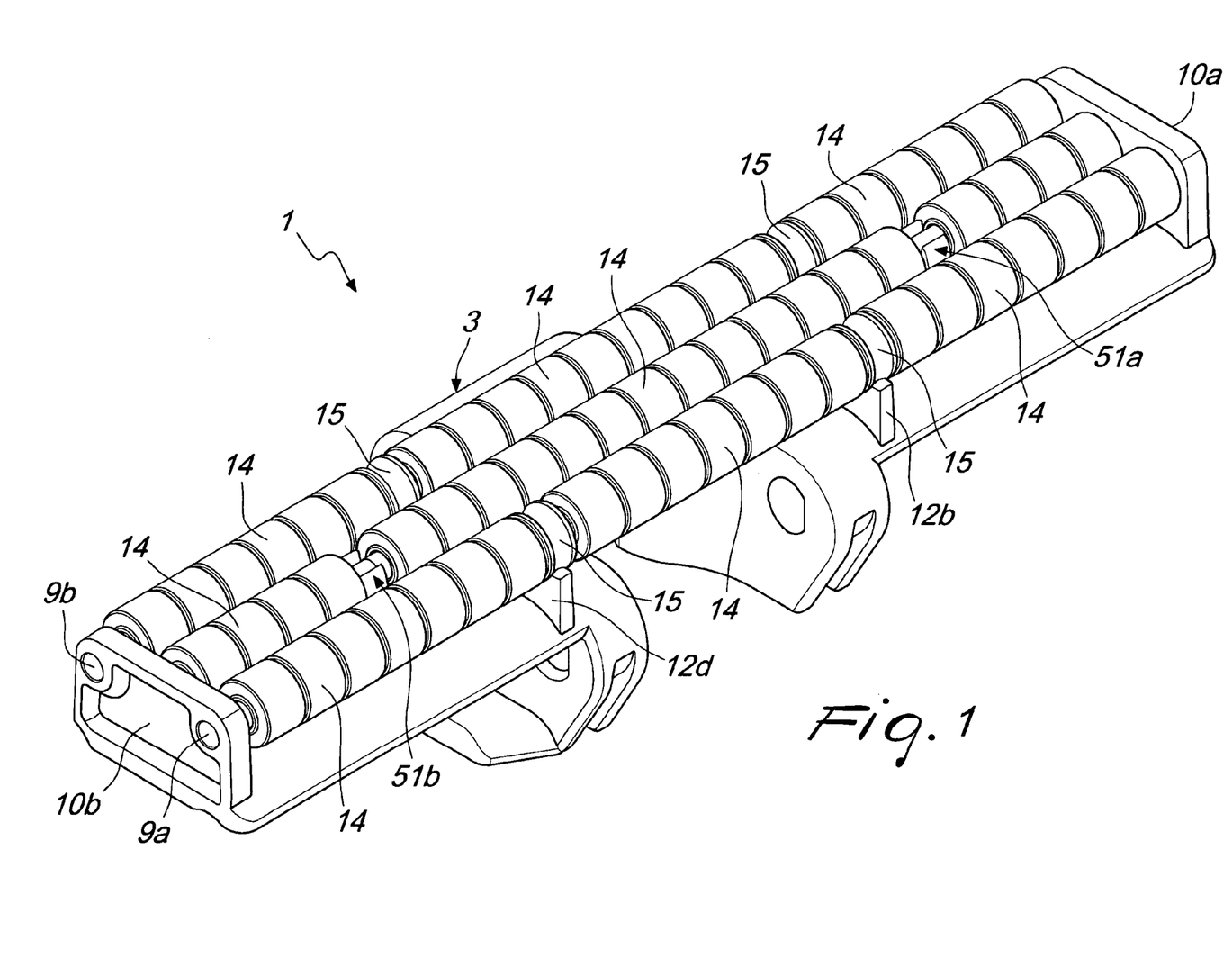
FIG. 1 is a top perspective view of a link of a chain according to the invention.
Figure 2:
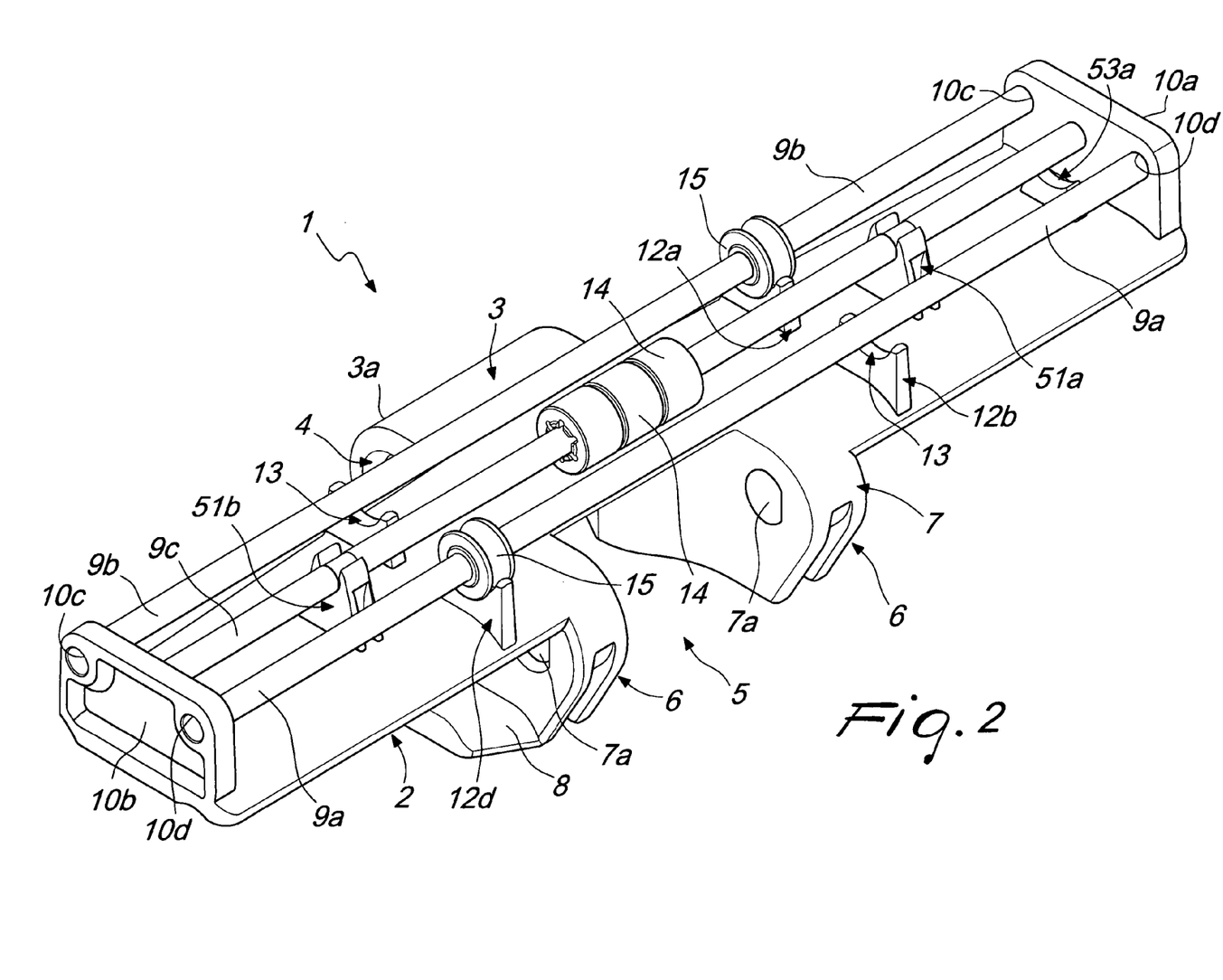
FIG. 2 is a view, similar to FIG. 1, of the invention, in which the first and second rollers and part of the third rollers have been omitted.
Figure 3:
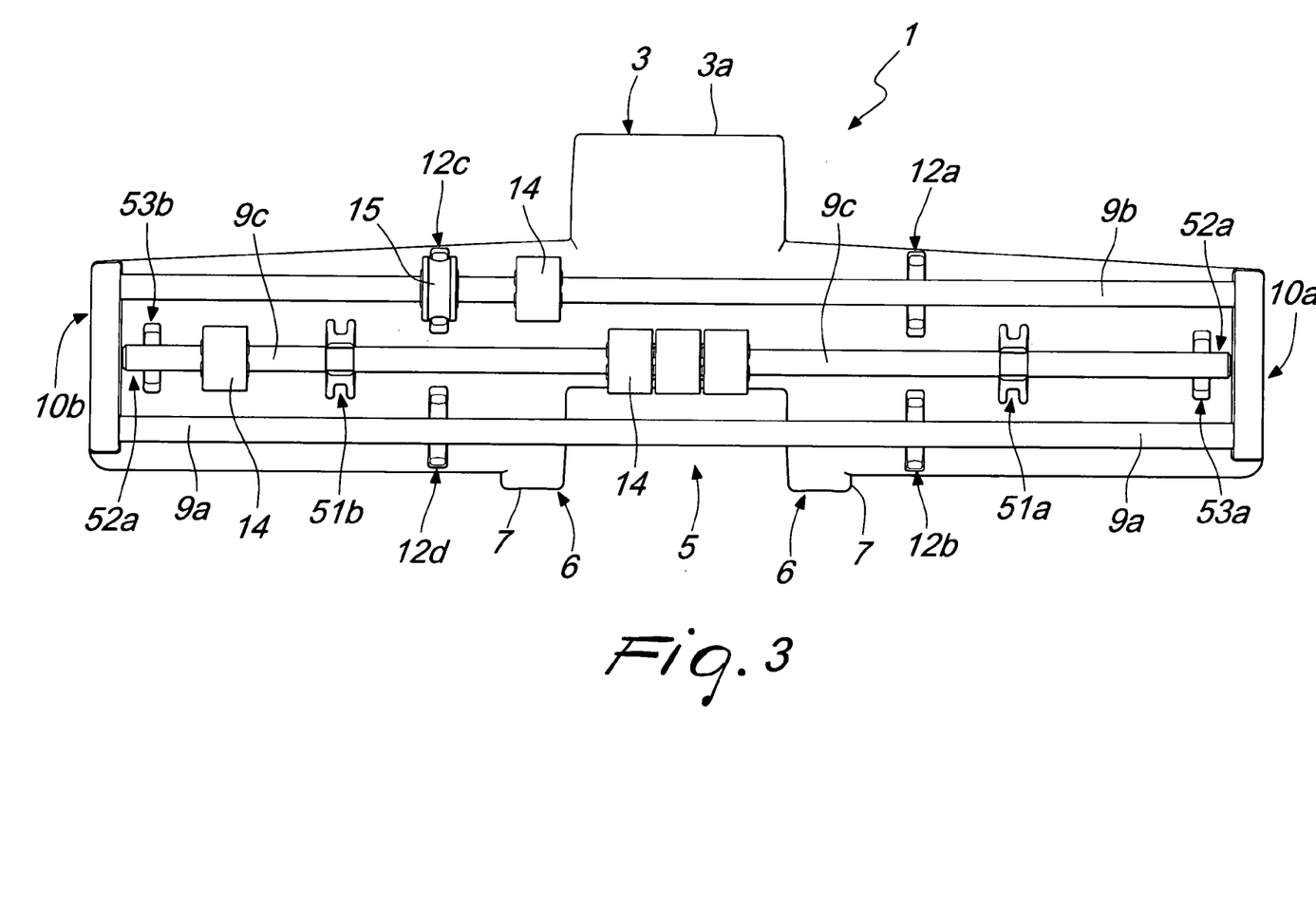
FIG. 3 is a top view of the invention according to FIG. 2.
Figure 4:
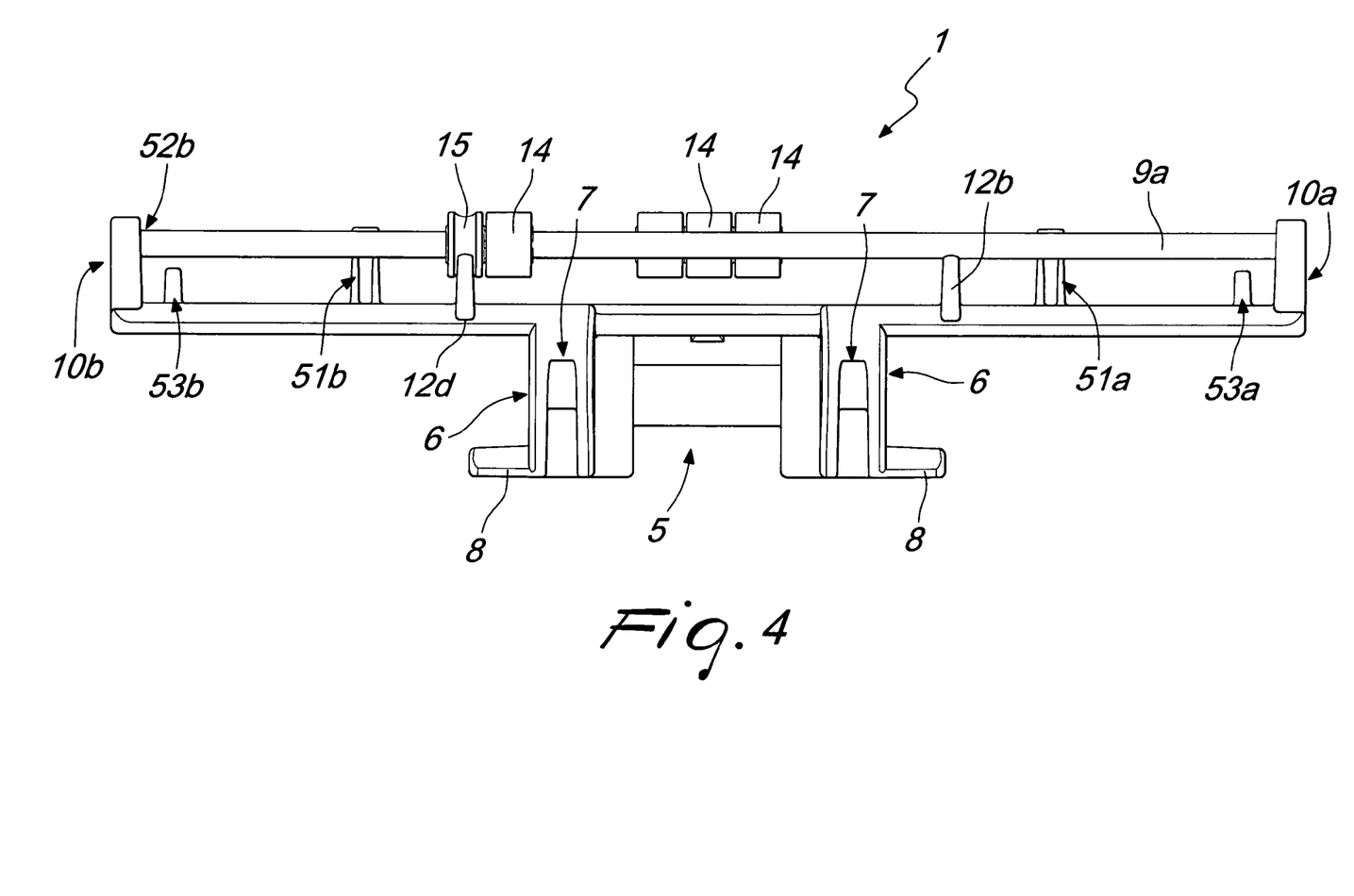
FIG. 4 is a front view of the invention according to FIG. 3.
Figure 5:
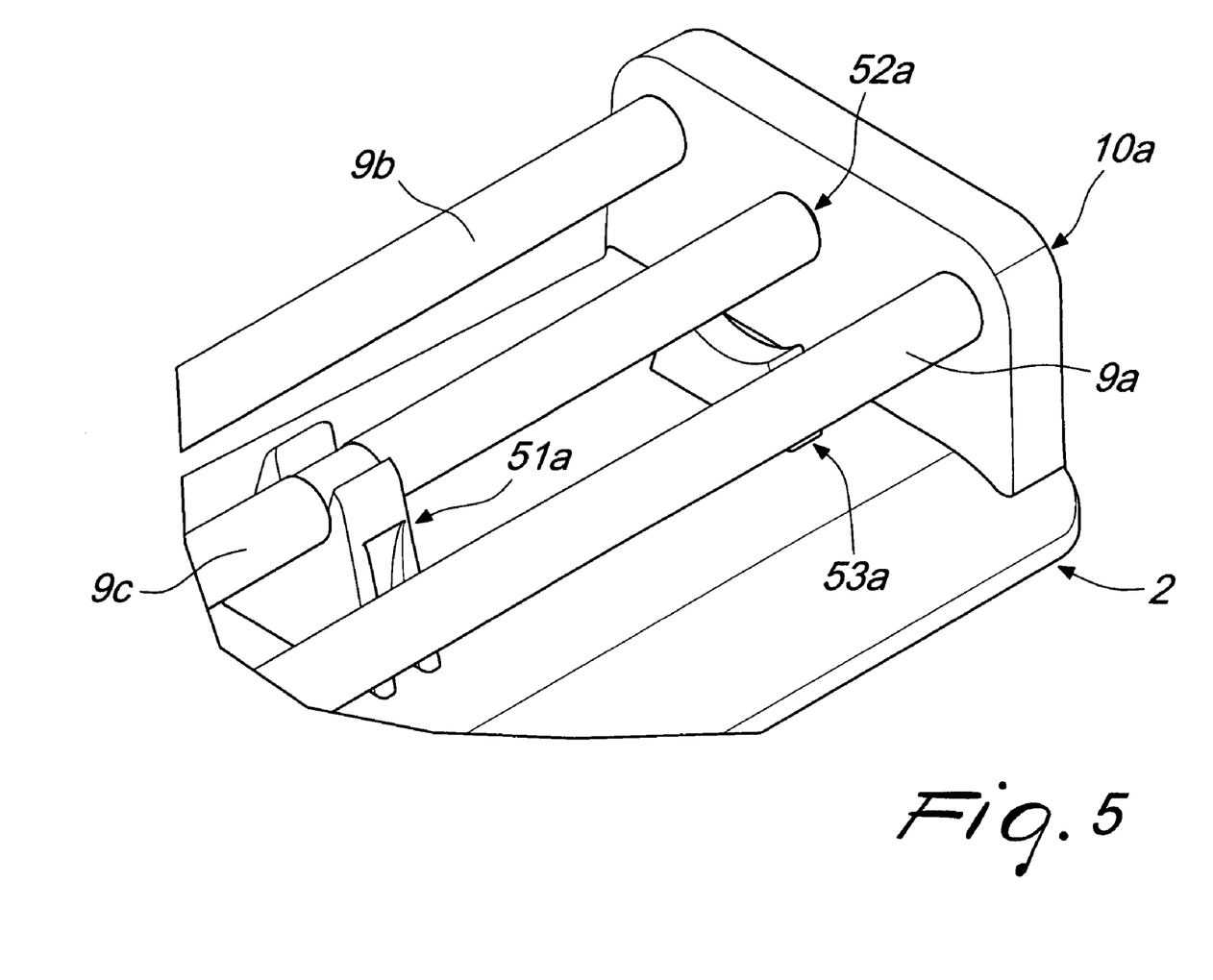
FIG. 5 is a view of a detail of the invention.
Figure 6:
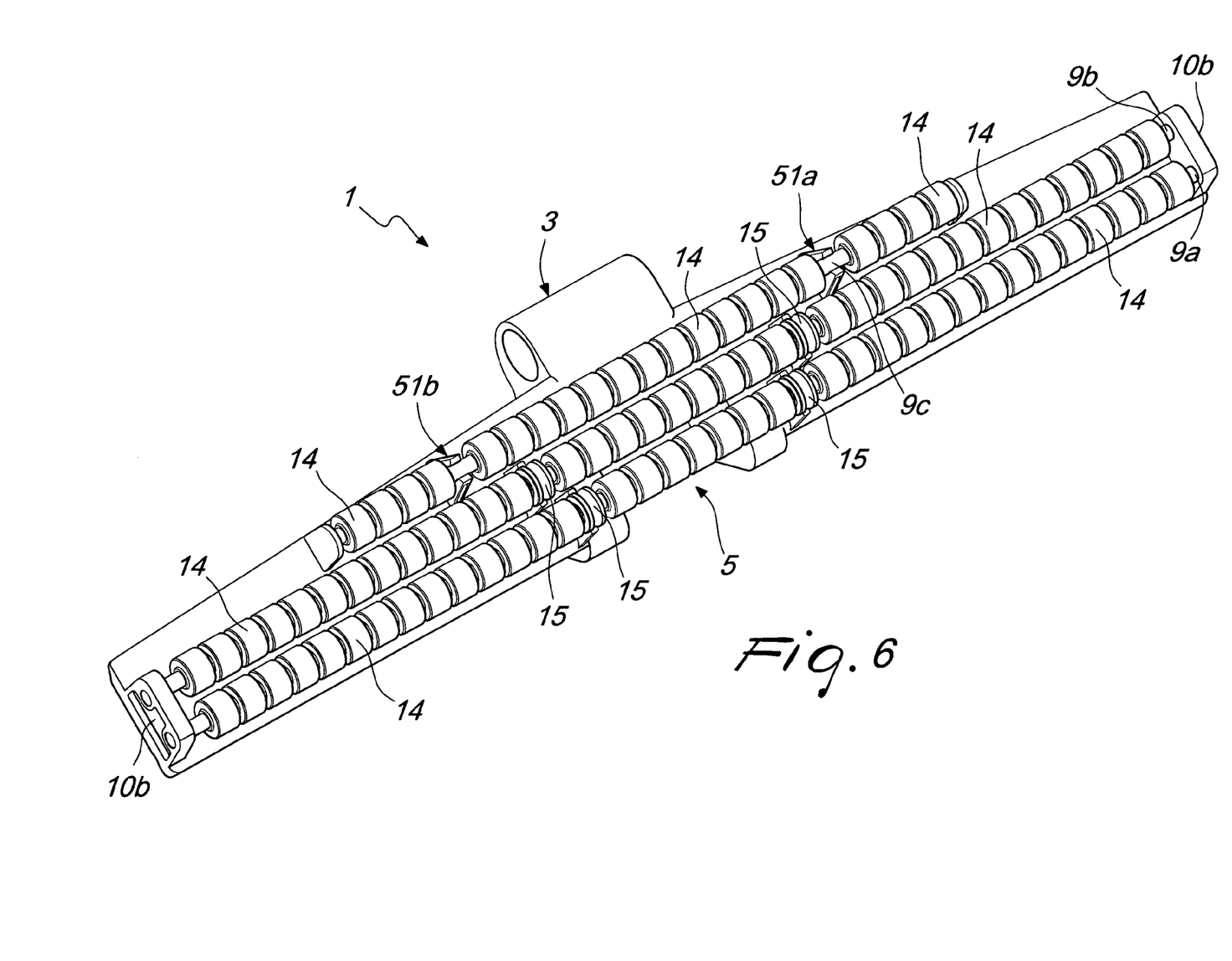
FIG. 6 is a view of an embodiment which uses a third shaft arranged externally with respect to one of said first and second shafts.

As an alternative, as shown in FIG. 6, the protrusions may be arranged on mutually different planes.

Each protrusion has, in plan view, an approximately rectangular shape, is parallel to the shoulders 10a and 10b, and is advantageously arranged in a mirror-symmetrical manner with respect to the central axis which lies transversely to the main base body 2.

Each protrusion, in a side view, is shaped approximately like an inverted right-angled trapezoid, in which the shorter parallel side is arranged upward and the longer parallel side is rigidly coupled to the main base body.

One or more third seats 13 are provided above each protrusion, at the shorter parallel side, and have an approximately semicircular cross-section; the complementarily shaped lateral surfaces of a respective second roller 15 interact on said third seats in the loaded condition for said link, said second roller being perforated axially and having a smaller diameter than the first rollers 14 and the third seats 13.

The first rollers 14 are arranged along the entire axis of the pair of first and second shafts 9a and 9b, except for the regions where the protrusions arranged in pairs 12a, 12b and 12c, 12d protrude from the main base body 2, and second rollers 15 act thereat and advantageously have a rolling surface which is centrally concave and is arranged between two flat lateral shoulders. Since the second rollers 15 have a smaller diameter than the third seats 13 and are supported rotatably by the pair of first and second shafts 9a and 9b, they do not rest on the third seats when the pair of first and second shafts is arranged in a straight configuration, for example when no load is present on the first rollers 14. The link further comprises a third shaft 9c, which lies on the same plane of arrangement as the first and second shafts 9a and 9b and with which first rollers 14 again are associated so that they can rotate freely. The third shaft 9c is supported by at least one pair of second supporting elements, which protrude from the main base body 2 and are each constituted by two lugs 51a and 51b, which have a slotted incision or guide in the upper surface which is adapted to receive and support said third shaft. The two lugs 51a and 51b are arranged along a distinct plane, which is transverse with respect to said third shaft and is also distinct with respect to the plane of arrangement of said first supporting elements. Advantageously, said two lugs are each arranged in the space that is not comprised between said pair of first supporting elements and are therefore adjacent to said pair of shoulders. Further, the ends 52a and 52b of the third shaft 9c are free and not connected to the two shoulders 10a and 10b.

The first rollers 14, associated with the third shaft 9c at the ends 52a and 52b, act rotatably on complementarily shaped guides 53a and 53b, which protrude from the main base body 2 in a region which is adjacent to the pair of shoulders 10a and 10b.

The third shaft can be interposed centrally between said first and second shafts or be arranged laterally to one of them. The operation of the link of conveyor chain according to the invention entails that if no load or a light load, constituted for example by an empty bottle, is present thereon, the pair of first and second shafts 9a and 9b has an approximately straight non-deformed configuration, so that the second rollers 15 are raised with respect to the respective facing third seat 13.

In this operating condition, the pair of first and second shafts 9a and 9b is rotatably associated only with the shoulders 10a and 10b, while the first and second rollers 14 and 15 are free to rotate in order to allow relative sliding of the product that they support with respect to the link 1, for example if said product supported thereby is locked in a chosen position by a retention barrier; low drag opposing the advancement of the conveyor chain is thus generated.

If the load conveyed by the link 1 is heavy, the two first and second shafts 9a and 9b are arranged in a deformed configuration; if the weight of said load exceeds a preset value, which can be defined for example analytically or experimentally, the lateral surface of the second rollers 15 makes contact with the corresponding surface of the third seat 13, so as to constitute a supporting point for the two first and second shafts.

In this condition, the second rollers 15 do not rotate freely, since they are locked by the friction between its lateral surface and the surface of the third seat 13; the presence of the second rollers 15, however, avoids the wear of the protrusions 12a, 12b, 12c and 12d, since there is no direct contact with the two first and second shafts, which rotate, and the surface of the third seat 13, which is fixed.

Further, the second rollers 15 rest on the surface of the third seat 13, remaining locked in their rotation, only if the weight of the conveyed load exceeds a preset value; wear processes are thus slowed further, since if a lightweight load is conveyed, the second rollers 15 are not in contact with the protrusions and therefore can rotate freely, no action being applied to the protrusions.

If debris, constituted for example by glass splinters caused by the breakage of conveyed bottles or by dirt from the surrounding environment, occurs on the link 1, it is further very easy to clean said link also at the central support.

This applies also to the third shaft 9c at the ends 52a and 52b, which are not supported by the two shoulders 10a and 10b.

Moreover, the presence of the second rollers 15 allows to obtain good uniformity of the upper loading surface, since the difference between the outside diameters of the first and second rollers can be very small; good positioning is therefore ensured even in the case of products which have a narrow resting base.

It has thus been found that the invention has achieved the intended aim and objects, an invention having been provided which allows to ensure low wear thereof during operation as well as quick and easy cleaning thereof, so as to require reduced line downtimes.

Finally, the invention allows optimum positioning of the conveyed products, even if said products have a narrow resting base.

Of course, the materials used, as well as the dimensions that constitute the individual components of the invention, may be more pertinent according to specific requirements.

The various means for performing certain different functions need not certainly coexist only in the illustrated embodiment, but may be present per se in many embodiments, including ones which are not illustrated.

The characteristics indicated as advantageous, convenient or the like may also be omitted or be replaced with equivalents.

The disclosures in Italian Patent Application No. TV2005A000121 from which this application claims priority are incorporated herein by reference.

What is claimed is:

1. A link for a conveyor chain, comprising:
   articulation means for articulated connection to a similar and adjacent link;
   a main base body which comprises two shoulders, said shoulders protruding upward from ends of transverse sides of said main base body and being arranged parallel to a direction of advancement of the chain;
   first and second shafts that have ends thereof rotatably supported with said pair of shoulders;
   first rollers being rotatably associated with said first and second shafts;
   second rollers associated on said pair of first and second shafts, that have a smaller diameter than said first rollers;
   at least one first pair of supporting elements which are activatable when a load passes thereon, protrude from said main base body and are arrangeable on a same arrangement plane which is transverse with respect to a plane of arrangement of said pair of first and second shafts, said first pair of first supporting elements comprising arc-shaped seats and said second rollers having a diameter that is smaller than said arc-shaped seats such that said second rollers being supported in a loaded condition by said at least one pair of first supporting elements;
   at least one pair of second supporting elements which protrude from said main base body and lie on a plane which is parallel and distinct with respect to the plane of arrangement of said first supporting elements; and
   a third shaft, with which further first rollers are associated rotatably, said third shaft being directly supported in guides of said at least one pair of second supporting elements and said third shaft having ends thereof that are free and not connected to said shoulders protruding from said main base body.

2. A link for a conveyor chain, comprising; articulation means for articulated connection to a similar and adjacent link; a main base body which comprises two shoulders, said shoulders protruding upward from ends of transverse sides of said main base body and being arranged parallel to a direction of advancement of the chain; first and second shafts that have ends thereof associated with said pair of shoulders; first rollers being rotatably associated with said first and second shafts; second rollers associated on said pair of first and second shafts, that have a smaller diameter than said first rollers; at least one pair of first supporting elements which are activatable when a load passes thereon, protrude from said main base body and are arrangeable on a same arrangement plane which is transverse with respect to a plane of arrangement of said pair of first and second shafts, said second rollers being supported in a loaded condition by said at least one pair of first supporting elements; at least one pair of second supporting elements which protrude from said main base body and lie on a plane which is parallel and distinct with respect to the plane of arrangement of said first supporting elements; and a third shaft with which further first rollers are associated rotatably, said third shaft being supported by said at least one pair of second supporting elements and having ends thereof that are free; the link further comprising seats of protrusions that constitute said first supporting elements, each one of said protrusions having, in a side view, a shape of an inverted right-angled trapezoid, in which a shorter parallel side is directed upward and a longer parallel side is rigidly coupled to the main base body, said seats being formed above each one of said protrusions at the shorter parallel side and having a semicircular cross-section, complementarily shaped lateral surfaces of said second rollers interacting on said third seats in a loaded condition of the link, said second rollers being further axially perforated and having a smaller diameter than said first rollers and said seats.

3. The link of claim 2, wherein said first rollers are arranged along an entire axis of said pair of first and second shafts, except for regions where said protrusions on which said second rollers act protrude from said main base body.

4. The link of claim 3, wherein said second rollers have a smaller diameter than said seats and are supported rotatably by said pair of first and second shafts.

5. The link of claim 3, wherein said second rollers are located away from said seats when said pair of first and second shafts is arranged along a rectilinear configuration, when no load is present on said first rollers.

6. The link of claim 2, wherein said pair of second supporting elements are constituted by two lugs which have a slotted incision or guide in an upper surface thereof which is adapted to receive and support said third shaft, said third shaft being on a same plane of arrangement as said first and second shafts and with which first rollers are associated so as to be freely rotatable, said third shaft being supported by said at least one pair of second supporting elements, which protrude from said main base body.

7. The link of claim 6, wherein said two lugs are arranged along a distinct plane which lies transversely to said third shaft and is also distinct with respect to a plane of arrangement of said first supporting elements.

8. The link of claim 7, wherein each one of said two lugs is arranged in a space that is different than a space comprised between said pair of first supporting elements and is adjacent to a pair of shoulders protruding upward and at lateral ends of transverse sides of said main base body.

9. The link of claim 8, wherein said third shaft has ends that are free and unconnected to said pair of shoulders.

10. The link of claim 9, wherein said first rollers associated with said third shaft at respective ends thereof are arranged so as to act rotatably on complimentarily shaped guides which protrude from said main base body in a region which is adjacent to said pair of shoulders.

11. The link of claim 9, wherein said third shaft is interposed centrally between said first and second shafts.

12. The link of claim 9, wherein said third shaft is arranged laterally with respect to one of said first or second shafts.

13. A link for a conveyor chain, comprising; a main base body; two shoulders protruding upward and at lateral ends of transverse sides of said main base body, said shoulders being arranged parallel to an advancement direction of the chain; first and second seats being formed on said shoulders and being mutually aligned along an axis which is longitudinal with respect to said main base body and transverse with respect to the advancement direction of the chain; a pair of first and second shafts having ends thereof associated with said first and second seats; a plurality of first free rollers being rotatably associated with said first and second shafts and being arranged on a same arrangement plane which is parallel to a plane of arrangement of a surface of said main base body from which said two shoulders protrude; at least one pair of first supporting elements that protrudes upward from said main base body, said at least one pair of supporting elements being constituted by two protrusions, said at least one pair of supporting elements being arrangeable on transverse plane that may be the same of the arrangement plane of said two first and second shafts, each one of said protrusions having, in plan view, a rectangular shape and being arranged parallel to said pair of shoulders in a position which is mirror-symmetrical with respect to a central axis that lies transversely to said main base body, the link further comprising: at least one third seat and second roller, each one of said protrusions having, in a side view, a shape of an inverted right-angled trapezoid, in which a shorter parallel side is directed upward and a longer parallel side is rigidly coupled to the main base body, said at least one third seat being formed above each one of said protrusions at the shorter parallel side and having a semicircular cross-section, complementarily shaped lateral surfaces of said at least one second roller interacting on said at least one third seat in a loaded condition of the link, said at least one second roller being further axially perforated and having a smaller diameter than said first rollers and said at least one third seat.

14. The link of claim 13, wherein said first rollers are arranged along an entire axis of said pair of first and second shafts, except for regions where said two protrusions on which said second rollers act protrude from said main base body.

15. The link of claim 14, wherein said second rollers have a smaller diameter than said at least one third seat and are supported rotatably by said pair of first and second shafts.

16. The link of claim 14, wherein said at least one second roller is located away from said at least one third seat when said pair of first and second shafts is arranged along a rectilinear configuration, when no load is present on said first rollers.

17. The link of claim 13, further comprising a third shaft and a pair of second supporting elements constituted by two lugs which have a slotted incision or guide in an upper surface thereof which is adapted to receive and support said third shaft, said third shaft being on a same plane of arrangement as said first and second shafts and with which first rollers are associated so as to be freely rotatable, said third shaft being supported by said at least one pair of second supporting elements, which protrude from said main base body.

18. The link of claim 17, wherein said two lugs are arranged along a distinct plane which lies transversely to said third shaft and is also distinct with respect to a plane of arrangement of said first supporting elements.

19. The link of claim 17, wherein each one of said two lugs is arranged in a space that is different than a space comprised between said pair of first supporting elements and is adjacent to said pair of shoulders.

20. The link of claim 17, wherein said third shaft has ends that are free and unconnected to said pair of shoulders.

21. The link of claim 17, wherein said first rollers associated with said third shaft at respective ends thereof are arranged so as to act rotatably on complimentarily shaped guides which protrude from said main base body in a region which is adjacent to said pair of shoulders.

22. The link of claim 17, wherein said third shaft is interposed centrally between said first and second shafts.

23. The link of claim 17, wherein said third shaft is arranged laterally with respect to one of said first or second shafts.

* * * * *